United States Patent [19]

Ebeling et al.

[11] 4,195,527

[45] Apr. 1, 1980

[54] METHOD OF AND APPARATUS FOR PRODUCING A FOAM-FORMING REACTION MIXTURE

[75] Inventors: Wilfried Ebeling, Cologne; Klaus Schulte, Leverkusen; Dieter Kreuer, Leverkusen, all of Fed. Rep. of Germany

[73] Assignee: Bayer Aktiengesellschaft, Leverkusen, Fed. Rep. of Germany

[21] Appl. No.: 906,798

[22] Filed: May 17, 1978

[30] Foreign Application Priority Data

May 27, 1977 [DE] Fed. Rep. of Germany ....... 2724132

[51] Int. Cl.$^2$ .............................................. G01N 9/02
[52] U.S. Cl. ..................................................... 73/434
[58] Field of Search ................. 73/32 R, 195, 194 M, 73/196, 202, 203, 433, 434; 137/91; 222/57

[56] References Cited

U.S. PATENT DOCUMENTS

| | | | |
|---|---|---|---|
| 2,708,360 | 5/1955 | Geer et al. | 73/434 |
| 3,050,145 | 8/1962 | Lane | 73/433 UX |
| 3,151,775 | 10/1964 | Whitehead | 73/434 X |
| 3,308,991 | 3/1967 | Glassey | 73/434 X |
| 3,541,863 | 11/1970 | Barron et al. | 73/434 |
| 3,848,618 | 11/1974 | Royse | 137/91 |

*Primary Examiner*—Donald Watkins
*Attorney, Agent, or Firm*—Gene Harsh; Joseph C. Gil

[57] ABSTRACT

The invention relates to a method of and an apparatus for producing a foam-forming reaction mixture of at least two liquid components which react together and which are fed continuously to a mixing zone where they are mixed together. The volumetric flow of at least one component is measured continuously both in the main pipe leading to the mixhead and also in a subsidiary pipe which branches off the main feed line between the storage for the components and its pump. This subsidiary stream serves as a source for intermittent weighing of the component so that the density of the reaction component can be periodically calculated and monitored. This helps ensure the proper mass of component entering the mixhead.

An apparatus is disclosed which achieves precise dosing of the components so that a product free of defects and having the desired properties may be produced.

5 Claims, 3 Drawing Figures

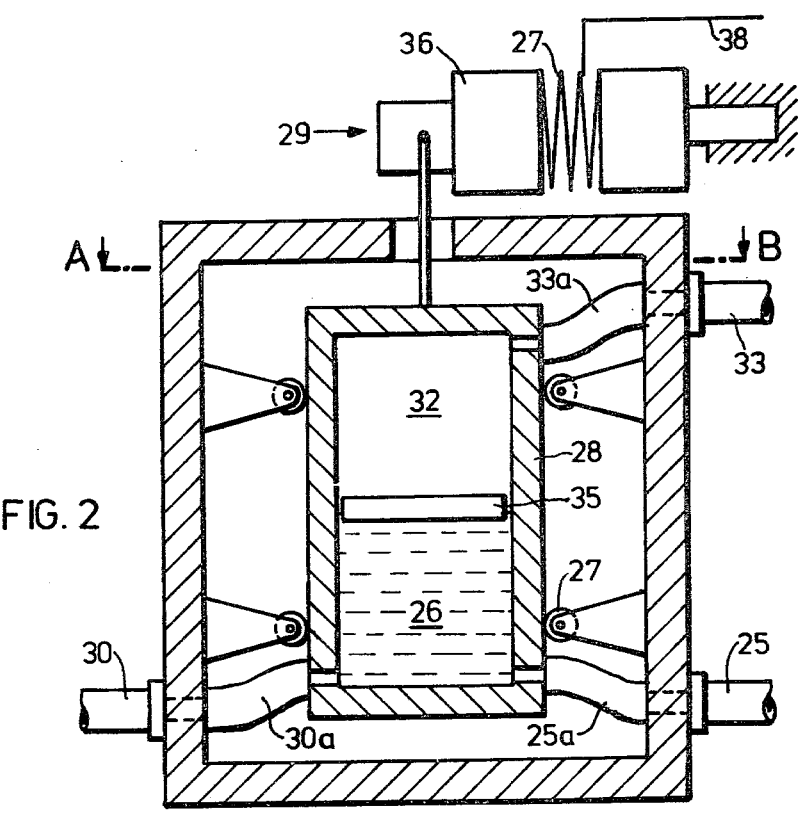
FIG. 2
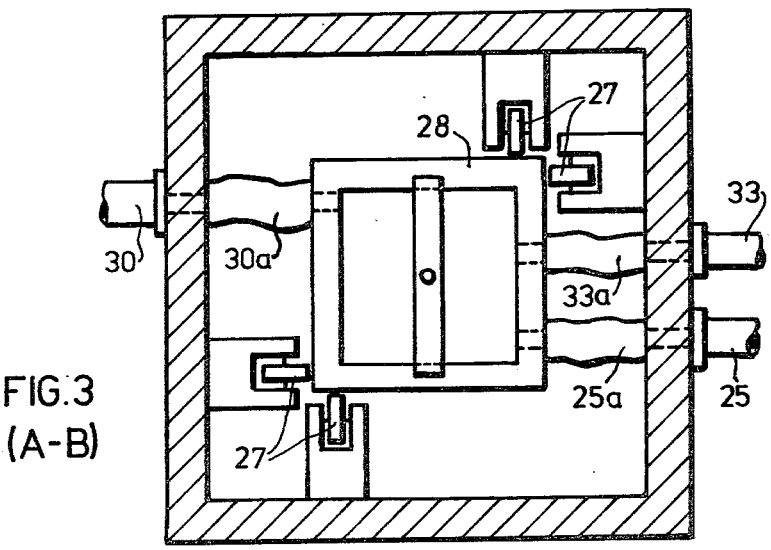
FIG. 3 (A-B)

METHOD OF AND APPARATUS FOR PRODUCING A FOAM-FORMING REACTION MIXTURE

BACKGROUND OF THE INVENTION

Polyurethane recipes are generally on a parts-by-weight basis which means that a mixing apparatus must be adjusted with respect to the mass flow. In the past, this was generally carried out in the following manner. The metering pumps were tested by allowing the quantity conveyed per unit of time to run out at a predetermined pressure and by subsequently weighing it at various normal pump adjustments. The mixing apparatus was adjusted in relation to the pump characteristics and its conveyed quantity Q, (kg/sec) so that the correct prescribed stoichiometric ratio would flow into the mixhead. This took place before production began. It was not possible to check that the pre-determined values were maintained during production. The entire time-consuming and complicated test run had to be repeated periodically to maintain sufficient reliability. Moreover, this testing method contained a large uncertainty factor since the weight was only measured under atmospheric pressure. Blowing agent could escape during this process due to its low boiling point.

Continuous measurement of the volumetric flow is practicable but is not sufficient since the densities, especially with gas-charged raw materials, vary a great deal at different working pressures. Temperature differences also produce changes in density which in turn result in a change in the mass flow. Such changes cannot be detected by measuring the volumetric flow.

Another considerable problem can be caused by blowing agent escaping from the component to which it is added. The blowing agent is generally added to the polyol component and dispersed therein. In the types of mixing apparatus which function in cycles, blowing agent may escape when the components are recycled into the working container. Blowing agent may, for example, dissolve in a pressure gas cushion situated above the surface of the liquid or the blowing agent may escape at points which are not sealed such as at the seal of the stirrer shaft on the storage container. Different amounts of blowing agent result in variations in density since the density of a typical polyol is about 1 g per $cm^3$ whereras that of the typical blowing agent is about 1.5 g per $cm^3$.

DESCRIPTION OF THE INVENTION

The object of the invention is to provide a method and an apparatus with which an exact dosing ratio may be maintained, which ensures a defect free end product with the desired properties.

The object of the invention is achieved by a method in which the flow of components is continuously or discontinuously divided into a main stream and a subsidiary stream. The subsidiary stream is brought to the same working pressure as that which exists in the main stream, just before introduction into the mixing zone. The volumetric flow of the subsidiary stream is measured and the amount of the subsidiary stream by volume which has flowed through during a specified period of time is determined by measurement. The amount by weight which has passed through during the same specified period of time is determined by weighing. The density of the components is determined therefrom as a quotient of the weight and the volume. The mass flow of the main stream of the component is determined as a product of the density of the component and the volumetric flow of the main stream. Then the determined value of the mass flow of the main stream is compared with a predetermined desired value.

The term "mass flow" means the amount by weight of a component conveyed per unit time.

If a deviation of this desired value occurs, the machine personnel has to look for the reason and to clear the fault.

The stream of components is advantageously divided into main stream and subsidiary stream upstream of the metering pump, i.e. on the suction side, so that the main stream conveyed through the metering pump to the mixing head is not exposed to any further influences. The continuously flowing subsidiary stream is generally recycled into the storage container during the weighing process. The quantity by weight of the component used periodically for weighing may also be recycled in order to avoid waste.

The method according to the invention has the advantage of enabling the mass flow to be determined continuously and, if necessary, the dosing proportions may be regulated immediately afterwards. Interruptions in production which formerly occurred in determining the mass flow are completely avoided.

The apparatus used for carrying out the method according to the invention comprises storage containers for the reaction components and feed pipes, which via metering pumps, from the storage containers to a mixhead, a device for measuring the volumetric flow being arranged in at least one feed pipe between the metering pump and the mixhead.

The novelty lies in the fact that a subsidiary pipe branches off upstream of the metering pump and leads to a subsidiary pump. A device for measuring the volumetric flow and a throttle are arranged downstream of the subsidiary pump. A changeover or reversing valve provided with two outlets is arranged downstream of the throttle. A return pipe leads away from one outlet thereof back to the storage container and a connecting pipe from the other outlet thereof leads to a weighing arrangement comprising a measuring cylinder. Pressure measuring instruments are arranged in the feed pipe downstream of the metering pump and in the subsidiary pipe downstream of the subsidiary pump.

The subsidiary stream is preferably relatively small in comparison to the main stream. It need only be large enough to fill the measuring cylinder of the weighing arrangement in a suitable period of time. The subsidiary pump is to have a correspondingly small output. Suitable pumps for the very small quantities to be conveyed are commercially available. The subsidiary pump brings the subsidiary stream to the same working pressure as the metering pump brings the main stream in order to produce identical ratios, for measuring the volumetric flow.

In a preferred embodiment of the apparatus according to the invention, the devices for measuring the volumetric flow and the weighing arrangement are connected via measured value converters to a computer. This enables the measured values to be fed directly into the computer so that the value of the mass flow may be obtained directly and compared with the prescribed reference value.

The devices for measuring the volumetric flow-rate are preferably provided with inductive sensors. They are particularly suitable for transmitting measured values.

The weighing arrangement preferably uses resistance strain guages. An expansion is used as a measure of the weight of the measured liquid component. Resistance strain gauges have the advantage that they use a measuring cylinder which only moves a few thousandths of a millimeter.

The pressure measuring instruments also preferably use resistance strain gauges.

The formation of the weighing arrangement has a closed measuring cylinder of rectangular perimeter and is guided vertically between rollers. The measuring cylinder has an inlet and outlet for the subsidiary stream of components in the lower region and a compressed air connection in the upper region. The liquid component is separated from the upper region by a plate which floats on the liquid.

Supply and discharge take place via flexible hoses. The compressed air connection is also in the form of a flexible hose. The connections are formed in such a way that they do not exert any adverse influence on the weighing operation. The rectangular perimeter of the measuring cylinder together with the guide rollers prevent twisting.

An embodiment of the apparatus according to the invention will now be described with reference to the accompanying diagrammatic drawings in which:

FIG. 2 is a side elevation of the weighing arrangement;

FIG. 3 is a view of the weighing arrangement taken along section A-B in FIG. 2.

Figure 1:
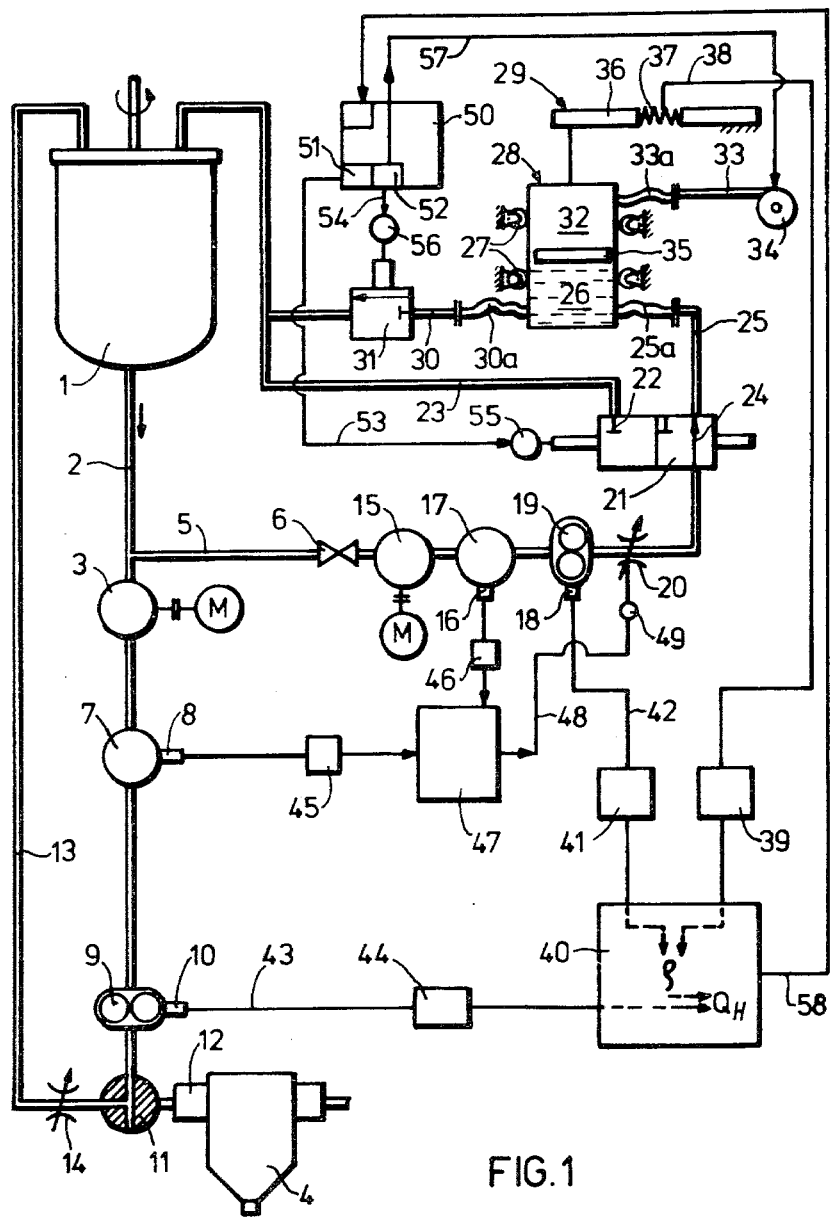
FIG. 1 shows part of the apparatus for a component.

A feed pipe 2 leads from a storage container via a metering pump 3 to a mixing head 4. A subsidiary pipe 5 having a stop-cock 6 branches off upstream of the metering pump 3. A commercially available pressure measuring instrument 7 which uses resistance strain gauges 8, a volumetric flow counter 9 provided with an inductive sensor 10 and a changeover valve 11, are provided between the metering pump 3 and the mixing head 4. The changeover valve 11 connects the feed pipe 2 selectively to an injection nozzle 12 of the mixing head 4, and a return pipe 13 with an adjustable throttle 14 via which recycling to the storage container 1 takes place.

A subsidiary pump 15 of very low output is arranged in the subsidiary pipe 5. A pressure measuring instrument 17 provided with resistance strain gauges 16, a volumetric flow counter 19 provided with an inductive sensor 18 and an adjustable throttle 20 are arranged upstream of a reversing valve 21 successively in the direction of flow. A return pipe 23 leads from one outlet 22 of the return valve 21 to the storage container 1. A connecting pipe 25 formed partly by a flexible hose 25a leads from the other outlet 24 into the lower region 26 of a measuring cylinder 28 of a weighing arrangement 29 which is moved vertically by rollers 27. Another connecting pipe 30, formed partly by flexible hose 30a, communicates via a stop valve 31 with a return pipe 23. A supply pipe 33 from a compressed air source 34 and formed partly by a flexible hose 33a opens into the upper region 32 of the measuring cylinder 28. The lower region 26 filled with the liquid component and the upper region 32 which may be filled with compressed air for the purposes of emptying are separated from each other by a floating plate 35. The measuring cylinder 28, the external perimeter of which is rectangular in shape to prevent twisting, is suspended from a movable beam 36 having resistance strain gauges 37.

A pulse line 38 leads from the movable beam 36 via a measured value converter 39 which converts the measured value into an electronically processable pulse to a computer 40. A pulse from the volumetric flow counter 19, which is converted by means of a measured value converter 41, is simultaneously fed via a pulse line 42 to the computer 40. The computer 40 determines the density of the liquid component from the two values supplied. However, the volumetric flow counter 9 also simultaneously delivers, via the measured value converter 44 arranged in the pulse line 43, pulses which correspond to the rate of volumetric flow produced by the metering pump 3. The computer 40 multiplies the density value with the last-mentioned measured value and indicates the mass flow travelling from the metering pump 3 to the changeover valve 11. The measured values are fed from the pressure measuring instruments 7 and 17 via measured value converters 45 and 46 to a regulator 47 which compares them, the working pressure measured with the pressure measuring instrument 7 serving as a control magnitude. In the event of changes in the pressures, the regulator 47 adjusts the throttle 20 via a pulse line 48 and a servo-motor 49 until both pressures coincide again.

A control instrument 50 continuously triggers the carrying out of the determining process at adjustable intervals in time. The interval corresponds to at least that time required for determining the mass flow value by filling, weighing and emptying the measuring cylinder and performing the necessary calculation. In addition to this automatic and periodic mode of operation, the control instrument 50 also allows occasional manual triggering of a determining process if necessary. In this event, the interval fed in prevents another determining process for being triggered until one determining process has been concluded in each case, so that the continuous determining process is not disturbed. A time interval sensor 51 arranged in the control instrument 50 serves to shift valve 21 for filling the measuring cylinder 28. A second interval sensor 52 is adjusted to a period of time corresponding to at least the time required for emptying the measuring cylinder 28. The control instrument 50 communicates via pulse lines 53 and 54 and servo-motors 55 and 56 with the valves 21 and 31. Another pulse line 57 is connected to the compressed air source 34, and a pulse line 58 leads from the computer 40 to the control instrument 50.

The procedure, in particular the process for determining the value of the mass flow, is described below.

The apparatus is started via a closing switch (not shown) which activates pumps 3 and 15. The changeover valve 11 is thereby disposed in the position shown so that the polyol component supplied from the storage container 1 is a circulated via the feed pipe 2 and the return pipe 13. The pressure measuring instrument 7 and the volumetric flow counter 9 commence operation when the apparatus starts up. As soon as the starting turbulence in the piping system has been damped i.e. after about 10 seconds, the valve 11 is shifted so that the polyol component flows via the injection nozzle 12 into the mixhead. The isocyanate side of the apparatus, (not shown) cooperates correspondingly.

When the apparatus starts up, the polyol also flows into the subsidiary pipe with the stop-cock 6 open. The subsidiary pump 15 begins to deliver at the same time as the metering pump 3. The metering pump 3 delivers a main stream of Q=50 l/min while the volume delivered by the subsidiary pump 15 is much smaller and is only 1 l/min. The pressure measuring instrument 17 and the volumetric flow counter 19 also operate as soon as the apparatus starts up. The operation of the control instrument 50 is delayed by 20 seconds. As already described, the pressure in the subsidiary stream is controlled by the regulator 47 to the working pressure in the main stream which serves as the control pressure. This control or coordination takes place continuously. The control instrument 50 shifts the valve 21 at the outlet 24 twenty seconds after the apparatus starts up so that the lower region 26 of the measuring cylinder 28 is filled. The valve 31 remains closed. The time interval of the interval sensor 51 is set at 12 seconds. The measuring cylinder 28 is accordingly filled at $V_N=0.28/12$ seconds at the predetermined flow rate of 1 l/min. The weight $Q_N$[kg/12 sec] of this volume is accordingly determined, the value is prepard for processing by the computer 40 in measured value converter 39 and is fed into the computer just as the value of the volumetric flow $V_N = 0.2$ 1/12 sec is fed via the measured value converter 41.

The first step of calculation reads:

$$\text{Density } \rho \text{ (kg/dm}^3\text{)} = \frac{Q_N(k/12 \text{ sec})}{V_N(l/12 \text{ sec})}$$

The value $\rho$ is multiplied by the value of the volumetric flow $V_H$ of the main stream by computer 40 in the second step of calculation, as follows:

$$\text{Mass flow } Q_H \text{ (kg/min)} = \rho(kg/dm^3) \times V_H(l/min)$$

Once the weight has been measured, i.e. the density $\rho$ determined by the computer 40, the computer 40 commands the control instrument 50 via the pulse line 58 to open the valve 31 via time interval sensor 52, pulse line 54 and servo-motor 56 and to set in operation the compressed air source 34 via the pulse line 57 in order to empty and to cleanse the measuring cylinder 28. After a further time interval determined by the interval sensor 52 and corresponding to the time required for emptying the measuring cylinder 28, the control instrument 50 causes the valve 31 to close via the pulse line 54 and the servo-motor 56. Once the period of time prescribed by the control instrument 50 for the determining process has expired, the next determination of the mass flow of the main stream is started by shifting the valve 21 to the outlet 24.

What is claimed is:

1. A method of producing a foam-forming reaction mixture from at lest two liquid components which react with each other and which are continuously fed to a mixing zone where they are mixed together and wherein the volumetric flow of at least one component is measured continuously, comprising
   (A) dividing the flow of components from a storage container into a main stream and a subsidiary stream;
   (B) adjusting the subsidiary stream to the same working pressure as that of the main stream just before the main stream's introduction into a mixing zone;
   (C) measuring the volumetric flow of the subsidiary stream which passes through during a predetermined time interval;
   (D) determining the weight of mixture which has passed through during the same predetermined time interval;
   (E) determining the density of the component therefrom as the quotient of said weight and said volume;
   (F) measuring the volumetric flow of the main stream; and determining the mass flow of the main stream of the component as the product of the density of the component determined in step (E) and the volumetric flow of the main stream.
   (G) Comparing the determined value of the mass flow of the main stream with a predetermined desired value.

2. An apparatus for producing a foam forming reaction mixture comprising storage containers for the reaction components; feed pipes which lead from the storage containers via metering pumps to a mixhead; a volumetric flow counter arranged in at least one feed pipe between the metering pump and the mixhead; a subsidiary pipe branched off upstream of said metering pump leading to a subsidiary pump; a volumetric flow counter downstream from said subsidiary pump; a throttle valve downstream from said volumetric flow counter; a changeover valve provided with two outlets arranged downstream from the throttle valve; a return pipe leading from one outlet of the changeover valve and a connecting pipe leading from the other outlet of the changeover valve to a weighing arrangement; a weighing arrangement comprising a measuring cylinder; pressure measuring instruments, one arranged in the feed pipe adjacent and downstream of the metering pump and one in the subsidiary pipe adjacent and downstream of the subsidiary pump; means for determining the density as the quotient of the weight measured in said weighing arrangement and the volume flow flowing through said volume at the flow counter which is downstream from said subsidiary pump; and, means for determining the mass flow as the product of the density determined by said density determining means and the volumetric flow flowing through said volumetric flow counter arranged in at least one feed pipe.

3. An apparatus according to claim 2, characterized in that the volumetric flow counters and the weighing arrangement are connected via measured value converters to a computer, said computer comprising means for comparing the determined value of the mass flow of the main stream with its predetermined value.

4. An apparatus according to claim 2 or 3, wherein the volumetric flow counters are provided with inductive sensors.

5. An apparatus according to claims 2 or 3, wherein the weighing arrangement comprises a closed measuring cylinder with a rectangular perimeter which is confined from lateral movement by but can move vertically through a set of rollers; the measuring cylinder having inlet and outlet parts in the lower region for the subsidiary stream of the components and an air connection opening into the upper region; the upper region of air being separated from the lower region of liquid component by a plate floating on the liquid component.

* * * * *